(12) United States Patent
Beers et al.

(10) Patent No.: US 10,882,624 B2
(45) Date of Patent: Jan. 5, 2021

(54) BEARING COOLING FLOW FOR TURBINE AND COMPRESSOR UTILIZED TO SUPPLY AIR FOR AIRCRAFT CABIN

(71) Applicant: Hamilton Sundstrand Corporation, Charlotte, NC (US)

(72) Inventors: Craig M. Beers, Wethersfield, CT (US); Darryl A. Colson, West Suffield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 51 days.

(21) Appl. No.: 16/292,677

(22) Filed: Mar. 5, 2019

(65) Prior Publication Data

US 2020/0283156 A1    Sep. 10, 2020

(51) Int. Cl.
*B64D 13/08* (2006.01)
*B64D 13/06* (2006.01)
*F01D 25/12* (2006.01)

(52) U.S. Cl.
CPC ............ *B64D 13/08* (2013.01); *B64D 13/06* (2013.01); *F01D 25/125* (2013.01); *B64D 2013/0625* (2013.01)

(58) Field of Classification Search
CPC .................. B64D 13/08; B64D 13/06; B64D 2013/0625; F16C 37/00; F16C 37/002; F01D 25/125
See application file for complete search history.

(56) References Cited

U.S. PATENT DOCUMENTS

| 5,113,670 | A | * | 5/1992 | McAuliffe | ............ F01D 25/125 |
| | | | | | 417/406 |
| 9,341,193 | B2 | | 5/2016 | Beers et al. | |
| 9,568,018 | B2 | | 2/2017 | Dorman et al. | |
| 10,155,592 | B2 | | 12/2018 | McAuliffe et al. | |
| 10,160,546 | B2 | | 12/2018 | Beers et al. | |

(Continued)

FOREIGN PATENT DOCUMENTS

| EP | 2995780 A2 | 3/2016 |
| GB | 1095129 | 12/1967 |

OTHER PUBLICATIONS

European Search Report for EP Application No. 19213863.4 dated Jun. 24, 2020.

*Primary Examiner* — Joseph F Trpisovsky
(74) *Attorney, Agent, or Firm* — Carlson, Gaskey & Olds, P.C.

(57) ABSTRACT

A turbine inlet supplies compressed air to drive a turbine impeller. There is a compressor impeller and a compressor inlet connected to supply air to be compressed to the compressor impeller. The compressor impeller delivers air to a compressor outlet. The compressor outlet is connected to the turbine inlet. A turbine outlet is connected to a first connection connected to an aircraft. The turbine impeller is connected to the compressor impeller by a drive shaft including a radially outwardly extending thrust disk, and thrust bearings provided on each side of the thrust disk. A cooling air inlet is connected to pass air along the thrust bearings, then radially inwardly and then axially along the shaft. The cooling air is directed to a cooling air outlet. The cooling air outlet is connected to a second connection maintained separate from the first connection. An environmental control system is also disclosed.

10 Claims, 2 Drawing Sheets

(56) References Cited

U.S. PATENT DOCUMENTS

| | | | |
|---|---|---|---|
| 2005/0210875 A1* | 9/2005 | Larue | F16C 17/024 60/602 |
| 2006/0059942 A1* | 3/2006 | McAuliffe | B64D 13/06 62/402 |
| 2013/0224016 A1* | 8/2013 | Beers | F04D 29/584 415/229 |
| 2015/0345510 A1* | 12/2015 | Beers | F04D 29/5853 415/180 |
| 2016/0272329 A1 | 9/2016 | Beers et al. | |

* cited by examiner

BEARING COOLING FLOW FOR TURBINE AND COMPRESSOR UTILIZED TO SUPPLY AIR FOR AIRCRAFT CABIN

BACKGROUND

This application relates to bearing cooling airflow for use in an air cycle machine that includes a turbine and a compressor to supply air to an aircraft cabin.

The air supply systems associated with aircraft are complex and must meet any number of challenges. One such system utilizes high pressure air to drive a turbine and, in turn, drive a compressor. The compressor compresses the air and delivers air to the turbine. Air downstream of the turbine is delivered into the aircraft cabin and cockpit.

It is known to supply cooling air to cool bearings associated with a shaft connecting the turbine to the compressor in such machines. It is also known that the bearings can sometimes be subject to damage, wear, etc. When such challenges occur, it is possible for the cooling air to entrain smoke, odor or other undesirable byproducts. In the prior art, this cooling air has been discharged into the compressor flow or into the turbine airflow. Such air flow eventually reaches the aircraft cabin.

SUMMARY

A machine for use in an environmental control system has a turbine impeller. A turbine inlet is connected to supply compressed air to drive the turbine impeller. There is a compressor impeller and a compressor inlet connected to supply air to be compressed to the compressor impeller. The compressor impeller delivers air to a compressor outlet. The compressor outlet is connected to the turbine inlet. A turbine outlet is connected to a first connection connected to an aircraft. The turbine impeller is connected to the compressor impeller by a drive shaft. The drive shaft includes a radially outwardly extending thrust disk, and thrust bearings provided on each of two axial sides of the thrust disk. A cooling air inlet is connected to pass air along the thrust bearings, then radially inwardly and then axially along the shaft. The cooling air is directed to a cooling air outlet. The cooling air outlet is connected to a second connection maintained separate from the first connection.

An environmental control system is also disclosed.

These and other features may be best understood from the following drawings and specification.

DETAILED DESCRIPTION

Figure 1:
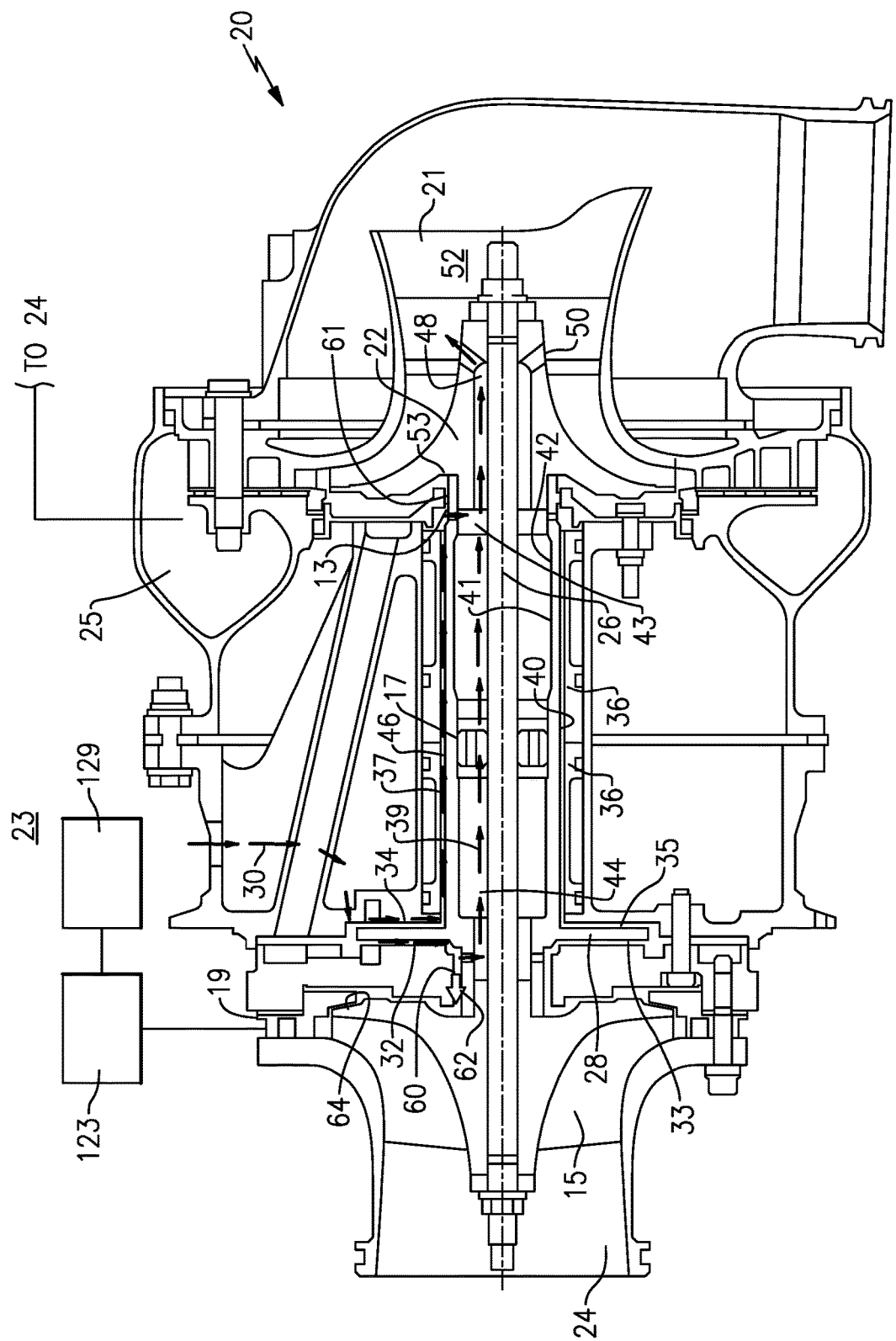
FIG. 1 shows an existing bearing cooling scheme.

FIG. 1 shows a conventional turbine and compressor machine 20 which is incorporated into an environmental control system ("ECS") 23. A compressor inlet 21 supplies air to a compressor impeller 22. The compressor inlet 21 may be connected to a tap from a gas turbine engine compressor. Compressed air is delivered to a compressor outlet 25, and then to a turbine inlet 24. The compressed air drives a turbine impeller 15. A turbine outlet 19 is connected to heat exchanger 123 and other components of ECS 23. At least a portion of air from turbine outlet 19 downstream of heat exchanger 123 is utilized as cooling air for an aircraft cabin 129 and/or cockpit.

When the turbine impeller 15 rotates, it drives a drive shaft 41 (there is also an internal tie shaft 26) connected to drive compressor impeller 22. A thrust disk 28 extends radially outwardly of an outer peripheral surface 40 of the drive shaft 41.

Thrust bearings 32 and 34 are formed on opposed axial sides 33/35 of the thrust disk 28. Cooling airflow 30, such as from the turbine inlet 24, is supplied along the thrust bearings 32 and 34 and radially inwardly. Bearings 36 are positioned to support the drive shaft 41. The outer peripheral surface 40 is supported on the bearings 36. Drive shaft 41 also has an inner peripheral surface 42. A tie shaft support 17 is positioned between the inner surface 42 and tie shaft 26. The cooling airflow 37 downstream of thrust bearing 34 passes along a path 46 to cool the outer surface 40 and bearings 36. The cooling air 39 downstream of the thrust bearing 32 passes into a chamber 44 and cools the inner surface 42 and the tie shaft 26 along with the tie shaft support 17.

These two airflows 37 and 39 reconnect downstream at connection 43 and communicate into a passage(s) 48 extending through the compressor impeller 22 to outlets 50. The cooling air leaving outlets 50 mixes with the inlet air in a chamber 52 approaching the compressor impeller 22. Thus, the air delivered into compressor outlet 25 includes this cooling air having passed through outlets 50 into chamber 52 and mixed with the normal inlet air from compressor inlet 21. Leakage 53 can also occur along a seal 61 and reach compressor outlet 25. A similar leakage can occur as shown at 60 across a seal 62 and reach the turbine outlet 19.

As mentioned above, since the cooling air reaches the compressor outlet 25 and, thus, the turbine outlet 19, if there is smoke, odors or impurities in the bearing cooling air, it can reach the aircraft cabin 129, which is undesirable.

Figure 2:
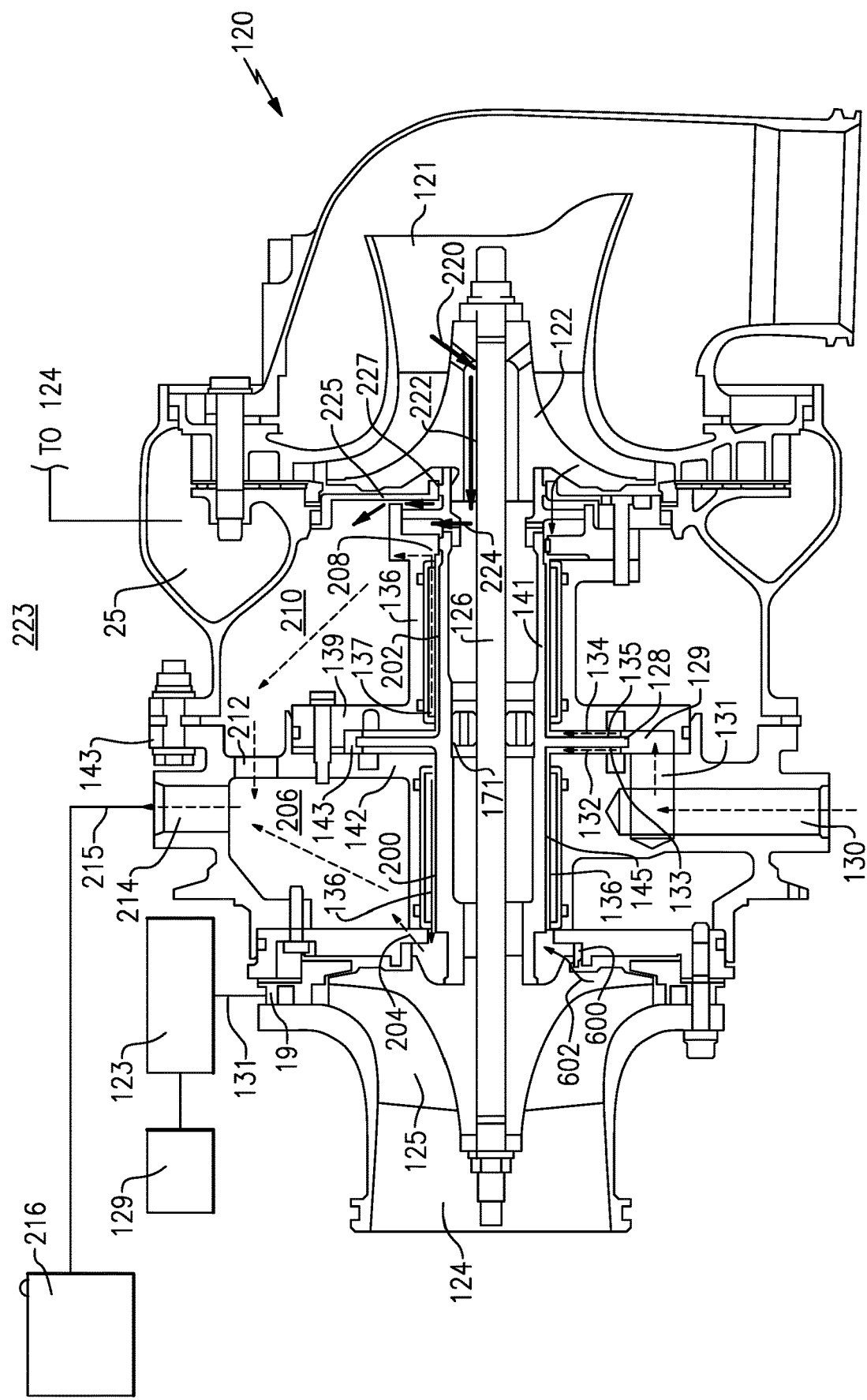
FIG. 2 shows the bearing cooling scheme of this disclosure.

FIG. 2 shows a turbine and compressor machine 120 which is part of ECS 223 for delivering air to heat exchanger 123 and then to the aircraft cabin 129 and other components of the ECS 223. A first exit connection 131 connects a turbine outlet 19 to heat exchanger 123. A compressor inlet 121 is connected to supply air from a gas turbine engine compressor to a compressor impeller 122. Compressor impeller 122 further compresses the compressed air and delivers it to compressor outlet 25. Compressor outlet 25 is connected to turbine inlet 124 which is connected to turbine impeller 125. Turbine impeller 125 expands the air and delivers it to turbine outlet 19 and then to heat exchanger 123 through first connection 131. A drive shaft 141 drives the impeller compressor 122 by rotation of the turbine impeller 125. There is also a tie shaft 126.

A housing 143 is formed by housing portions 142 and 139 which come together at an axially intermediate location and surround a thrust disk 128. Turbine inlet air is supplied through inlet 130, a passage 131, a chamber 129 and then passes along thrust bearings 132 and 134 defined by axial faces 133 and 135 of thrust disk 128. The air 137 from thrust bearing 134 extends to cool an outer surface 202 of drive shaft 141 and to cool a bearing 136 axially between the compressor impeller 122 and the thrust disk 128. Airflow from thrust bearing 132 passes at 145 in a direction along outer surface 202 toward the turbine impeller 125 to cool surface 200 and another bearing 136.

Air downstream of the path 145 along surface 200 passes through an outlet 204 into a chamber 206 formed on a turbine side 133 of the thrust disk 128. Air downstream of path 137 now passes radially outwardly at 208. That air moves into a chamber 210 formed axially between a compressor side 135, the thrust disk 128 and the impeller 122.

In addition, air passes through a leakage hole 220 in the compressor impeller 122 along a path 222 into an outlet 224 and into chamber 210. In addition, an air path 225 of air leaking across a seal 227 passes into chamber 210. The air from chamber 210 passes through openings 212 in housing portion 142 and into chamber 206. That air passes into a cooling air outlet 214. A leakage air path 602 passes across seal 600 and into chamber 206.

Outlet 214 is at an ambient pressure and is dumped as shown at dump 216 such as to atmosphere. A second connection 215 connects outlet 214 to dump 216. Since 215 will see atmospheric pressure the leakage paths 225 and 602 will flow to connection 215. This is in contrast to the prior art where the leakage was into the compressor and turbine. This is achieve because of the higher pressures in the compressor and turbine compared to connection 215.

It could be said that the main bearing cooling flow in this machine 120 is maintained separate from an airflow passing to an environmental control system 23. In this manner, the problem with odors, smoke, etc. reaching the aircraft cabin are addressed. In a sense, air in first connection 131 is kept separate from the air in second connection 215.

A machine 120 for use in an environmental control system 223 could be said to include a turbine impeller 125 and a turbine inlet 124 configured to port compressed air to drive the turbine impeller. A compressor impeller 122 and compressor inlet 121 are configured to port air to the compressor impeller. The compressor impeller 122 is connected to deliver air into a compressor outlet 25. The compressor outlet 25 connects to the turbine inlet 124. A turbine outlet 19 connects to a first connection 131 to be connected to an aircraft cabin 129. The turbine impeller 125 connects to the compressor impeller 122 by a drive shaft 141. The drive shaft 141 includes a radially outwardly extending thrust disk 128, and thrust bearings 132/134 are provided on each of two axial faces 133/135 of the thrust disk 128. A cooling air inlet 130 connects to pass along the thrust bearings 132/134, and radially inwardly and axially along the drive shaft 141, and then to a cooling air outlet 214. The cooling air outlet 214 connects to a second connection 215 maintained separate from the first connection 131.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A machine for use in an environmental control system comprising:
   a turbine impeller and a turbine inlet configured to port compressed air to drive said turbine impeller;
   a compressor impeller and compressor inlet configured to port air to said compressor impeller, said compressor impeller connected to deliver air into a compressor outlet, said compressor outlet connected to said turbine inlet, a turbine outlet connected to a first connection to be connected to an aircraft cabin;
   said turbine impeller connected to said compressor impeller by a drive shaft;
   said drive shaft including a radially outwardly extending thrust disk, and thrust bearings provided on each of two axial faces of said thrust disk;
   a cooling air inlet connected to pass air along said thrust bearings, and radially inwardly and axially along said drive shaft, and then to a cooling air outlet, said cooling air outlet connected to a second connection maintained separate from said first connection;
   wherein said second connection is connected to a dump at atmospheric pressure; and
   wherein holes pass through said compressor impeller, such that air from said compressor inlet is connected to pass to the cooling air outlet.

2. The machine as set forth in claim 1, wherein a first air path downstream of a first of said thrust bearings is connected to move in a first direction toward said compressor impeller and a second air path downstream of a second of said thrust bearings is connected to move in a second direction toward said turbine impeller.

3. The machine as set forth in claim 2, wherein said cooling air outlet is radially outward of said drive shaft.

4. The machine as set forth in claim 2, wherein said first air path is connected to a first chamber, and said second air path is connected to a second chamber, with said first and second chambers being connected together such that a combined airflow will reach said cooling air outlet.

5. The machine as set forth in claim 4, wherein said first chamber is formed in part by a first housing portion between said thrust disk and said compressor impeller and said second chamber is formed in least in part by a second housing portion, and between said thrust disk and said turbine impeller.

6. A system comprising:
   an environmental control system configured to supply air to an aircraft cabin and including a machine and a heat exchanger;
   the machine having a turbine with a turbine impeller and a turbine inlet configured to port compressed air to said turbine impeller;
   a compressor impeller and compressor inlet configured to port air to said compressor impeller, said compressor impeller connected to deliver air into a compressor outlet, said compressor outlet connected to said turbine inlet, a turbine outlet connected to a first connection connected to the heat exchanger, said heat exchanger to be connected to the aircraft cabin;
   a drive shaft connecting said turbine impeller to said compressor impeller;
   said drive shaft including a radially outwardly extending thrust disk, and thrust bearings provided on each of two axial faces of said thrust disk; and
   a cooling air inlet connected to pass air along said thrust bearings, and radially inwardly and axially along said drive shaft, and then to a cooling air outlet, said cooling air outlet connected to a second connection maintained separate from said first connection;
   wherein said second connection is connected to a dump at atmospheric pressure; and
   wherein holes pass through said compressor impeller, such that air from said compressor inlet is connected to pass to the cooling air outlet.

7. The system as set forth in claim 6, wherein a first air path downstream of a first of said thrust bearings is connected to move in a first direction toward said compressor impeller and a second air path downstream of a second of said thrust bearings is connected to move in a second direction toward said turbine impeller.

8. The system as set forth in claim 7, wherein said cooling air outlet is radially outward of said shaft.

9. The system as set forth in claim 7, wherein said first air path is connected to a first chamber, and said second air path is connected to a second chamber, with said first and second chambers being connected together such that combined airflow will reach said cooling air outlet.

10. The system as set forth in claim 9, wherein said first chamber is formed in part by a first housing portion, and between said thrust disk and said compressor impeller and said second chamber is formed in least in part by a second housing portion, and between said thrust disk and said turbine impeller.

\* \* \* \* \*